US009077961B1

(12) United States Patent
Saltzman (10) Patent No.: US 9,077,961 B1
(45) Date of Patent: Jul. 7, 2015

(54) ROLLING SHUTTER TIMING TESTER

(71) Applicant: Lucasfilm Entertainment Company Ltd., San Francisco, CA (US)

(72) Inventor: Jeffrey Saltzman, San Francisco, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 133 days.

(21) Appl. No.: 13/830,460

(22) Filed: Mar. 14, 2013

Related U.S. Application Data (60) Provisional application No. 61/760,977, filed on Feb. 5, 2013.

(51) Int. Cl.
*H04N 17/00* (2006.01)
*H04N 5/222* (2006.01)

(52) U.S. Cl.
CPC .................................. *H04N 17/002* (2013.01)

(58) Field of Classification Search
CPC ... H04N 5/2354; H04N 5/2256; H04N 17/00; H04N 17/002; G03B 15/05
USPC ............... 348/45, 56, 68, 131, 132, 180, 187, 348/371, 294, 295, 296, 308, 222.1, 362
See application file for complete search history.

(56) References Cited

U.S. PATENT DOCUMENTS

| | | | | |
|---|---|---|---|---|
| 8,363,042 B2 * | 1/2013 | Nussbacher et al. | .......... | 345/207 |
| 8,737,832 B1 * | 5/2014 | Lin et al. | .......... | 396/234 |
| 2005/0178950 A1 * | 8/2005 | Yoshida | .......... | 250/208.1 |
| 2008/0164314 A1 * | 7/2008 | Meier et al. | .......... | 235/462.1 |
| 2010/0147952 A1 * | 6/2010 | Carlson | .......... | 235/462.41 |
| 2010/0214416 A1 * | 8/2010 | Ruuska | .......... | 348/159 |
| 2010/0232778 A1 * | 9/2010 | Gwak et al. | .......... | 396/157 |
| 2011/0163166 A1 * | 7/2011 | Wang et al. | .......... | 235/472.01 |
| 2011/0303750 A1 * | 12/2011 | Wang | .......... | 235/469 |
| 2012/0187190 A1 * | 7/2012 | Wang et al. | .......... | 235/462.06 |
| 2012/0327251 A1 * | 12/2012 | Majewicz et al. | .......... | 348/187 |
| 2013/0161392 A1 * | 6/2013 | Goren et al. | .......... | 235/455 |
| 2013/0208132 A1 * | 8/2013 | Ryan et al. | .......... | 348/207.11 |
| 2014/0078277 A1 * | 3/2014 | Dai et al. | .......... | 348/68 |
| 2014/0078278 A1 * | 3/2014 | Lei | .......... | 348/68 |
| 2014/0163319 A1 * | 6/2014 | Blanquart et al. | .......... | 600/109 |
| 2014/0246494 A1 * | 9/2014 | Wang et al. | .......... | 235/462.07 |

* cited by examiner

*Primary Examiner* — Aung S Moe
(74) *Attorney, Agent, or Firm* — Kilpatrick Townsend & Stockton LLP (57) ABSTRACT

A device includes a plurality of vertically aligned pairs of light sources. The device is configured to sequentially illuminate the vertically aligned pairs of light sources. The output illuminating can be captured by a camera having a rolling shutter delay to create an image having a rolling shutter artifact. The image can be analyzed to determine the rolling shutter delay of the camera.

25 Claims, 7 Drawing Sheets

ROLLING SHUTTER TIMING TESTER

CROSS-REFERENCE TO RELATED APPLICATIONS

This application claims priority to U.S. Provisional Application No. 61/760,977 filed Feb. 5, 2013, entitled "Rolling Shutter Timing Tester", the entire contents of which is hereby incorporated by reference.

BACKGROUND

This specification relates to camera hardware testing.

Some digital camera equipment uses an image sensor that records an image with a series of horizontal lines of sensors. These types of image sensors are sometimes called active-pixel sensors, and include sensors such as Complementary Metal Oxide Semiconductor (CMOS) sensors. One feature of conventional active-pixel sensors is that images captured by the sensor are captured one horizontal line at a time, resulting in an image that is captured over a time window. By way of comparison, other types of film and image sensors, e.g., charge-coupled device (CCD) sensors, capture the entire image at the same time.

SUMMARY

A rolling shutter timing tester includes a row of vertically aligned light source pairs. The pairs are illuminated sequentially and recorded by a camera with a rolling shutter delay. Artifacts in the recording can be analyzed to determine the duration of the rolling shutter delay.

In one aspect, a system includes a plurality of vertically aligned pairs of light sources. The system is configured to sequentially illuminate the vertically aligned pairs of light sources. The output illuminating can be captured by a camera having a rolling shutter delay to create an image having a rolling shutter artifact.

Implementations can include any, all, or none of the following features. Each pair of light sources includes an upper light source and a lower light source, and the upper light sources are horizontally aligned and the lower light sources are horizontally aligned below the corresponding upper light sources. To sequentially illuminate vertically aligned pairs of light sources, the system is configured to apply an illumination cycle including alternately i) illuminate a pair of vertically aligned pairs of light sources and ii) delay for an illumination delay; and turn off all light sources after all light sources have been illuminated. To turn off all light sources, the system is further configured to delay for a cycle delay. The camera has an exposure time; and the illumination delay is the exposure time divided by the number of vertically aligned pairs of light sources. The cycle delay is less than the illumination delay. The system further includes an input module for receiving the illumination delay and the cycle delay. The system including a computing system configured to determine the duration of the rolling shutter delay based on an image of the system captured by the camera.

In one aspect, a method includes receiving an image, captured by a camera with a rolling shutter delay, of a system configured to sequentially illuminate, after illumination delays, vertically aligned pairs of light sources. The method further includes determining the duration of the rolling shutter delay. The method further includes outputting the duration of the rolling shutter delay.

Implementations can include any, all, or none of the following features. The received image captures one or more illuminated pairs of light sources, wherein the system sequentially illuminates vertically aligned pairs of light sources, including alternately i) illuminating a pair of vertically aligned pairs of light sources and ii) delaying for an illumination delay; and wherein determining the duration of the rolling shutter delay includes determining the portion of the image between upper light sources in each pair and the lower light sources in each pair; determining the differences in a count of upper light sources in each pair that appear to be lit and a count of lower light sources in each pair that appear to be lit in the image; determining an inner-row delay by multiplying the difference by the illumination delay; and determining the duration by adjusting the inner-row delay for the entire image. Each pair of light sources includes an upper light source and a lower light source, and wherein the upper light sources are horizontally aligned and the lower light sources are horizontally aligned below the corresponding upper light sources. The method including receiving, by a computing system, a video, captured by the camera, of the system, the video containing the image; and finding, by a computing system, the image in the video by receiving an indication that a count of upper light sources in each pair that appear to be lit is different than a count of lower light sources in each pair that appear to be lit in the image. The image was captured when the illumination of the system and the video recording of the camera were in phase.

In one aspect, a method includes sequentially illuminating, by a system includes a plurality of vertically aligned pairs of light sources, the vertically aligned pairs of light sources. The output illuminating can be captured by a camera having a rolling shutter delay to create an image having a rolling shutter artifact.

Implementations can include any, all, or none of the following features. Each pair of light sources includes an upper light source and a lower light source, and wherein the upper light sources are horizontally aligned and the lower light sources are horizontally aligned below the corresponding upper light sources. Sequentially illuminating the vertically aligned pairs of light sources includes cycling between: alternately i) illuminating a pair of vertically aligned pairs of light sources and ii) delaying for an illumination delay; and turning off all light sources after all light sources have been illuminated. Turning off all light sources includes delaying for a cycle delay. The camera has an exposure time; and the illumination delay is the exposure time divided by the number of vertically aligned pairs of light sources. The cycle delay is less than the illumination delay. The method including receiving, through an input module, the illumination delay and the cycle delay.

The systems and process described here can be used to find or verify the rolling shutter delay of a camera. The rolling shutter timing tester may be constructed in a form factor that allows a single person to move, program, start, and record the rolling shutter timing tester. A cycle delay of the rolling shutter timing tester can be used to allow the camera and the rolling shutter timing tester to come into phase without any calibration or synchronization routines. A rolling shutter timing tester may be constructed with no moving parts.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION

Some digital camera equipment uses an image sensor that records an image with a series of horizontal lines of pixel sensors. These sensors often operate sequentially, capturing the image one horizontal line of pixel sensors at a time. Therefore, the camera captures a single image or frame of video over a period of time, often with the top of the image captured first, and followed by each successive lower line of sensors, until the bottom of the image is captured last. The time delay from capturing image data at the first row of pixel sensors to capturing image data at the last row of pixel sensors can be referred to as a rolling shutter time or rolling shutter delay for the camera.

To measure the rolling shutter delay for a camera, a rolling shutter timing tester can be recorded to create an image showing a rolling shutter delay artifact. The rolling shutter timing tester can contain two rows of light sources that illuminate in sequence from right to left while being recorded by a camera with a rolling shutter delay. A single image or frame of the tester can then be analyzed to calculate the rolling shutter delay of the camera that captured the image or frame.

Figure 1:
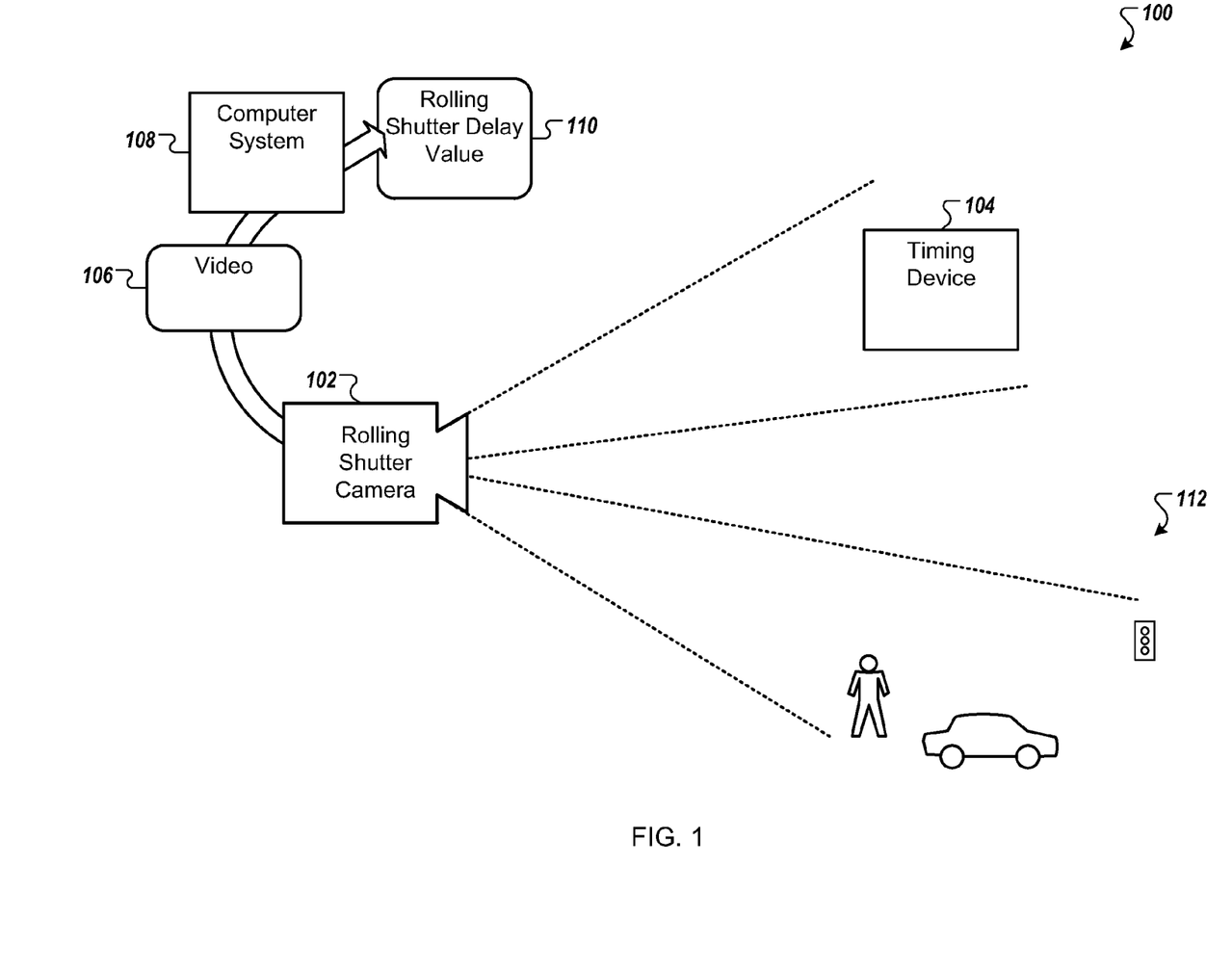
FIG. 1 is a block diagram of an example of a system for measuring the rolling shutter delay of a camera.

FIG. 1 is a block diagram of an example of a system 100 for measuring the rolling shutter delay of a camera 102. In the system 100, the camera 102 has a rolling shutter delay when capturing an image or frame of video. That is, the top of the image or frame is captured earlier in time than the bottom of the image. In some implementations, the camera 102 has physical components that expose the film or image sensor over time. In some other implementations, the camera 102 contains an image sensor (e.g., a CMOS sensor) that captures an image as if the camera 102 had exposed the sensor over time from top to bottom. While this description refers to a camera with a rolling shutter that exposes an image from top to bottom, other orientations are possible (e.g., bottom to top, side to side). In those situations, appropriate changes to the configuration and/or use of the rolling shutter timing tester may be made (e.g. rotating the rolling shutter timing tester).

In this example, the camera 102 is procured for recording of a motion picture, but other uses of cameras with rolling shutter delay are possible. For example, these types of cameras can be used for robotic vision or for recording physical phenomena for medical, scientific, or engineering purposes.

To measure the rolling shutter delay, the camera 102 records a video 106 of a rolling shutter timing tester 104. The rolling shutter timing tester 104 displays a series of lights illuminated at different times that are captured at different horizontal levels of the video 106. This combination of different times and heights result in a video 106 that contains visual artifacts (visual contents in the video that differs from the real appearance of what was recorded) associated with the rolling shutter delay.

A computer system 108 can be used to analyze the artifacts of the video 106 to calculate a rolling shutter delay value 110 for the camera 102. This rolling shutter delay value may be, for example, the amount of time that passes between when the camera 102 records the top of a frame and the bottom of a frame in the video 106. This rolling shutter delay value 110 may then be recorded and used in conjunction with future uses of the camera 102.

For example, the rolling shutter camera 102 may later be used to film a movie scene 112. During this shooting, the rolling shutter delay value 110 may be available to the cinematographers so that they can account for the rolling shutter delay of the camera 102. For example, if the camera 102 is known to have a large rolling shutter delay value 110, the cinematographers can avoid shooting scenes in which vertical lines move quickly across the view plane of the camera 102. Alternatively, the camera 102's rolling shutter delay value 110 can be used intentionally to create visual artifacts for a desired effect. The rolling shutter delay value 110 may also be used in postproduction of a video captured by the camera 102.

Figure 2:
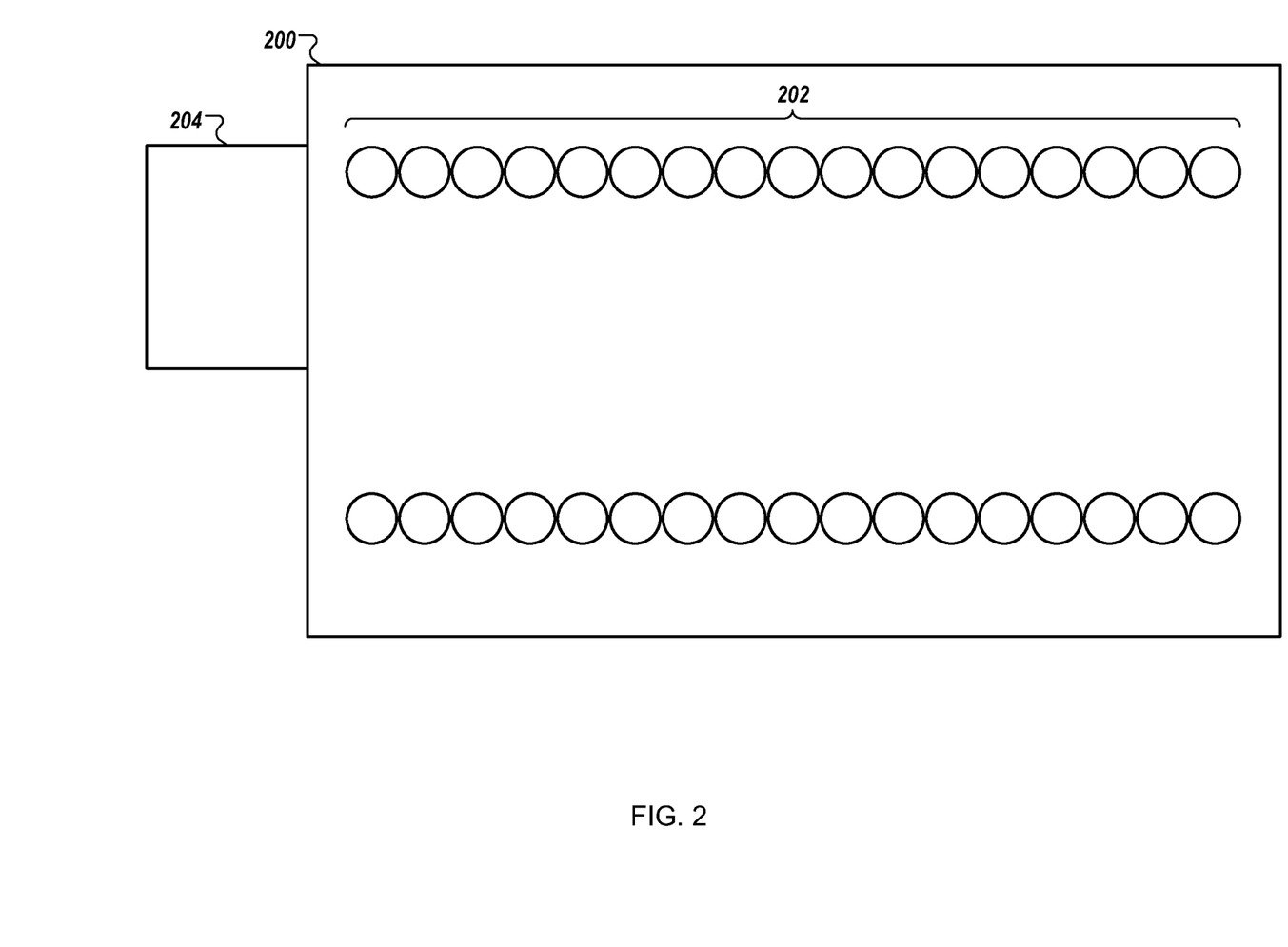
FIGS. 2 and 3 are block diagrams of an example of a rolling shutter timing tester.
Figure 3:
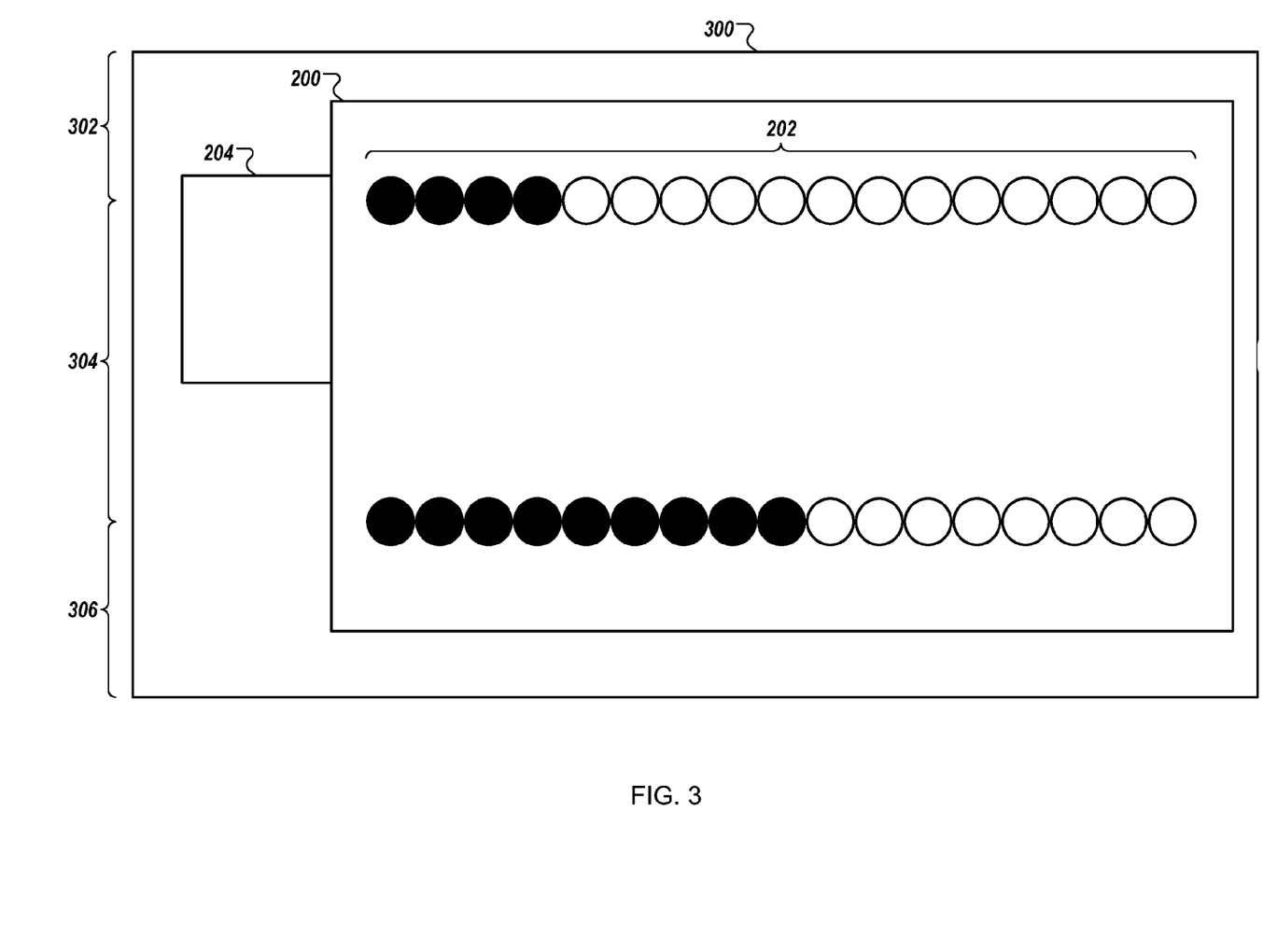

FIGS. 2 and 3 are block diagrams of an example of a rolling shutter timing tester 200. The rolling shutter timing tester includes light sources 202 (e.g. light emitting diodes) arranged in two horizontal rows such that each light source 202 in one row has a matching pair in the other row. In FIG. 2, the rolling shutter timing tester 200 is shown with none of the light sources 202 illuminated.

Figure 4:
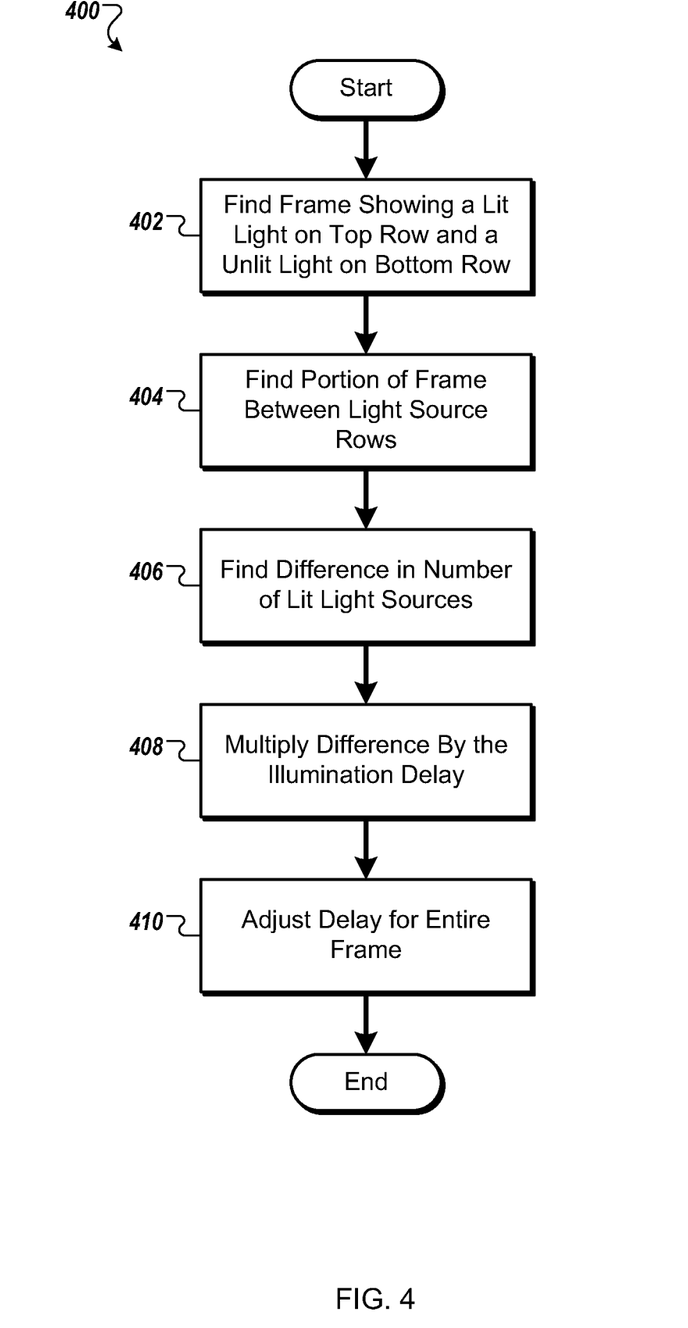
FIG. 4 is a flow chart of an example process for calculating the rolling shutter delay of a camera.

In general, the rolling shutter timing tester 200 may be composed of any suitable material for housing the light sources 202, associated electronic components described with respect to FIG. 4, and an input module 204. For example, the rolling shutter timing tester 200 may be constructed from a metal or plastic housing that is substantially closed around the electronics. In another configuration, the rolling shutter timing tester 200 can be made from a wooden frame to which the light sources 202, electronics, and input module 204 are affixed.

The rolling shutter timing tester 200 may be constructed so that a single person is able to lift, move, place, and turn on the rolling shutter timing tester 200 in the field of view of a camera. For example, the rolling shutter timing tester 200 may weigh approximately five pounds and may include one or more handles and/or surfaces suitable for holding by a human operator. Alternatively, the rolling shutter timing tester 200 may be incorporated into another calibration or testing device, for example, a calibration device used to measure some features of a camera (e.g. stereoscopic parameters, lighting conditions). In some configurations, the light sources 202 may be lasers that illuminate points on a wall or other surface.

The input module 204 may be included in the rolling shutter timing tester 200 to receive input from a human user or a computing device. For example, the software running on the rolling shutter timing tester 200 may accept one or more user-adjustable parameters (e.g. frames per second that a measured camera records at) through the input module 204. The input module may receive these parameters, for example, based on the state of physical switches or dials adjusted by a user, by way of a wired or wireless communication from a computing device or camera, or through any other appropriate format. The input module 204 may also include input to turn on and off the rolling shutter timing tester 200.

The light sources 202 may be configured so that each matching pair of light sources 202 in the top and bottom row are vertically aligned and illuminate at the same time. For example, beginning from a state in which all light sources 202 are off, the leftmost light source 202 on the top and bottom can illuminate simultaneously. After a short delay, referred to here as illumination delay, the next pair moving left to right illuminate. This delay and simultaneous illumination can be repeated until all pairs of light sources 202 are illuminated. After a different delay, referred to here a cycle delay, all of the light sources 202 turn off. The illumination cycle can be repeated.

This illumination route can create the visual appearance of illumination moving from the left to the right of the light sources 202. With a sufficiently short illumination delay, this appearance of movement may be fast enough to create a rolling shutter artifact in an image or video recording of the rolling shutter timing tester 200. This artifact can then be analyzed in order to determine the rolling shutter delay of the camera that created the recording.

In one example configuration, the rolling shutter timing tester 200 can use an illumination delay and/or cycle delay that are based on the frames per second or exposure time of the camera recording the rolling shutter timing tester 200. This frames per second or exposure time value may be, for example, hard coded into the software of the rolling shutter timing tester 200 or may be input through the input module 204. Alternatively or additionally, the illumination delay and/or cycle delay may be hardcoded or entered through the input module 204.

A user or the rolling shutter timing tester 200 can calculate an illumination delay as the exposure length of the camera divided by the number of light source 202 pairs. For a camera frame rate with 24 frames per second, the duration of each frame is 41.6 ms. If the exposure length for each frame is half the frame rate, the exposure length is 20.8 ms. For a rolling shutter timing tester 200 with 17 pairs of light sources 202, the illumination delay found by dividing the exposure length, 20.8 ms, by the number of light source 202 pairs, 17, results in an illumination delay of 1.22 ms.

In some configurations, a cycle delay that is different than the frame rate may be used. By using such a cycle delay, each successive cycle of the rolling shutter timing tester will begin at a different point within the exposure window of a captured image. Eventually, the camera and the illumination of the rolling shutter timing tester 200 can come into phase for at least one frame. That is, the exposure of some frames will begin at or very near the same time that the rolling shutter timing tester 200 begins to illuminate the first pairs of light sources 202. In such a case, synchronization routines (e.g. simultaneous start commands, or a command by one to start the other) of the camera and the rolling shutter timing tester 200 may be unnecessary.

A particular cycle delay can be calculated as the frame rate plus the square of the frame rate. For a camera with a frame rate that is 24 frames per second, 1/24 s, the square of the frame rate, (1/24)^2, is 1/576 s, or 1.74 ms. The cycle delay in this case, using the sum of the frame rate, 41.6 ms, and the square of the frame rate, 1.74 ms, can be found to be 43.4 ms.

Other illumination and/or cycle delay values may be used by the rolling shutter timing tester 200. For example, the cycle delay may be calculated by adding 1 ms to the frame rate of the camera, or no cycle delay may be used.

As shown in FIG. 3, the rolling shutter timing tester 200 is shown with some of the light sources 202 illuminated as captured in a frame 300 by a camera with a rolling shutter delay. That is, while the rolling shutter timing tester 200 is configured to illuminate each vertical pair of light sources 202 substantially simultaneously in sequence from left to right, a camera with a rolling shutter delay captures frame 300 of the rolling shutter timing tester 200 earlier in time at the top of the image and later at the bottom. As such, the rolling shutter delay of camera causes the camera to capture the rolling shutter timing tester 200 in one state when the top row is captured, four light source 202 pairs illuminated, and in a different state when the bottom row is captured, nine light source 202 pairs illuminated. This visual artifact may then be used in an analysis of the captured frame to determine the rolling shutter delay of the camera that captured the frame.

In general, the rolling shutter delay can be determined by finding the portion of the image between the two rows of light sources 202, finding the delay needed to illuminate the light sources 202 that are lit in the bottom row and unlit in the top row, and adjusting that delay for the total height of the frame 300. One example of this determination is shown in FIG. 4

FIG. 4 is a flow chart of an example process 400 for calculating the rolling shutter delay of a camera. The process 400 can be performed by, for example, a computer system such as the computer system 108. However, another system, or combination of systems, can be used to perform the process. The process may be performed with a computer application specifically developed to calculate a rolling shutter delay, or with, for example, a general purpose image viewing or manipulating application. The process, or portions of the process may, be performed in an automated fashion with little or no input, or may be performed by a computer system in response to continuous user input. In the description that follows, video of a rolling shutter timing tester is being described. However, a similar process may be used for a single still image of a rolling shutter timing tester.

A frame of the video is obtained for analysis (402). For example, a user and/or computer program can search a video having multiple frames to find a frame that shows the rolling shutter artifact clearly. Such a frame shows, for example, at least one lit light source on the top row of light sources and at least one unlit light source on the bottom. Once this frame is identified, that frame may be selected for analysis and the other frames of the video may be ignored for purposes of the process 400. One such example frame is shown in frame 300.

The portion of the frame between the rows of light sources is determined (404). For example, a user and/or a computer program can find the center, in the frame, of a light source in the top row of the rolling shutter timing tester and the center of a light source on the bottom row. This distance can be measured and divided by the vertical height of the frame to determine the portion of the frame between the rows of light sources.

For example, if a frame is 600 pixels in height, and the distance between the center of a light source in the top row and the bottom row is found to be 400 pixels, the portion of the frame found to be between the rows of light sources would be 400 divided by 600, or 66.7%.

The difference in number of lit light sources is found (406). For example, a user and/or a computer program can find the difference in the number of lit light sources in the top row of the frame and in the bottom row of the frame. In the example shown in frame 300, the bottom row contains 9 lit light sources and the top row contains 4 lit light sources, for a difference of 5.

The difference is multiplied by the illumination delay (408) to find an inner-row delay. For example, a user and/or a computer program can determine the time difference between when the top row of light sources is captured in the frame and when the bottom row is captured by multiplying the illumination delay of the rolling shutter timing tester with the difference value. If, for example, the difference is 5 and the illumination delay is 1.3 ms, a time of 6.5 ms is found. This 6.5 ms inner-row delay represents only the rolling shutter delay associated with the capture of the frame between the two rows of light sources, not the whole frame.

To find the rolling shutter delay for the entire frame, the inner-row delay is adjusted for the entire frame (410). For example, a user and/or computer program can multiply the inner-row delay by the inverse of the portion of the image between the rows of light sources. In the example where the inner-row delay is 6.5 ms and the portion covered is 66.7%, the 6.5 ms is multiplied by 1/66.7% or 4.55 ms to produce a rolling shutter delay of 9.75 ms.

For clarity, another example calculation is shown below. Let the difference in number of lit light sources, diff, be 3; the portion of the frame between the rows of light sources, p, be 39%, and the illumination delay, $d_i$, be 1.22 ms. To solve for the rolling shutter delay of the camera, $d_{rs}$, the following equation may be used:

$$d_{rs} = (\text{diff} * d_i) * (1/p)$$

$$d_{rs} = (3 * 1.22 \text{ ms}) * (1/39\%)$$

$$d_{rs} = 9.39 \text{ ms}$$

Figure 5:
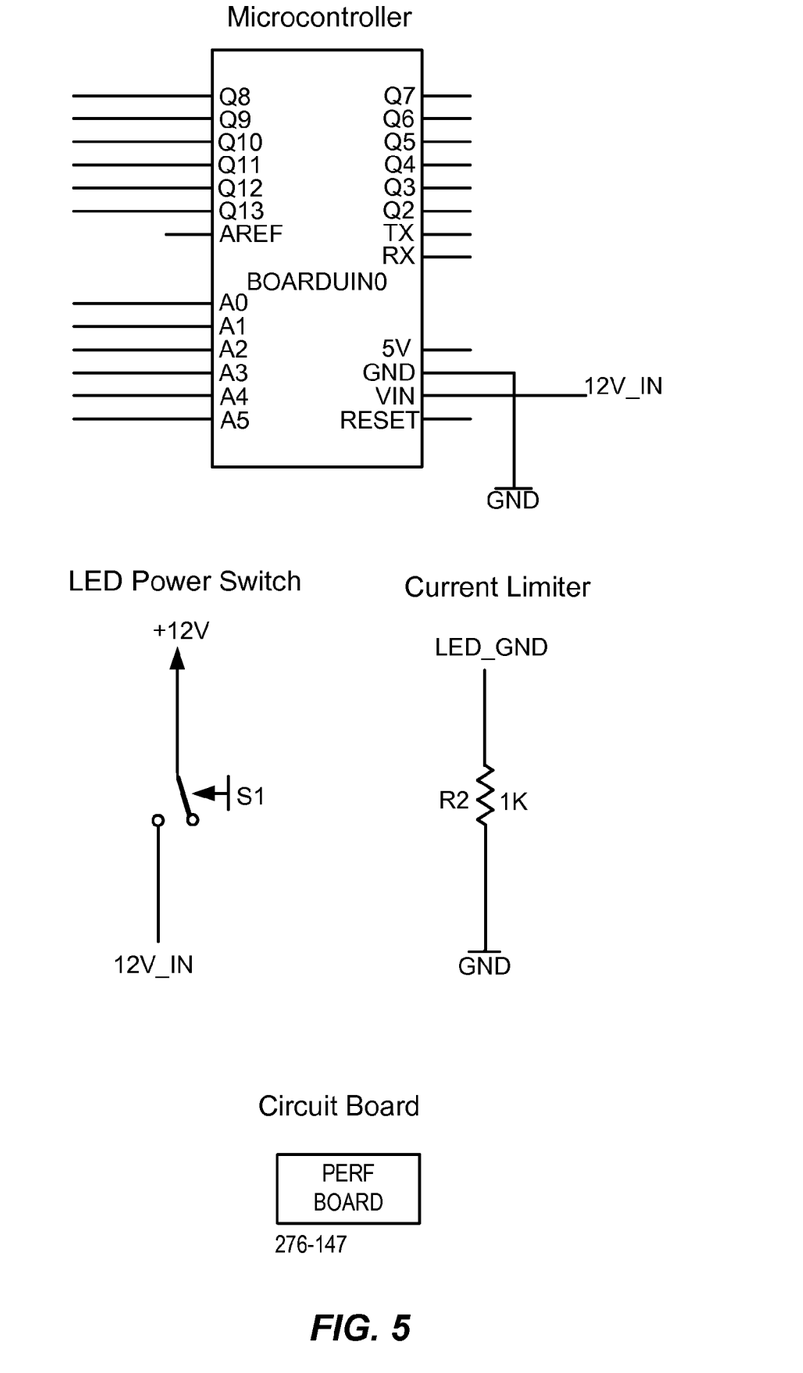
FIG. 5 is an electronics schematic of an example rolling shutter timing tester.

FIG. 5 is an electronics schematic of an example rolling shutter timing tester with twenty four LED arranged in twelve pair groups. A microcontroller is included to control the illumination of the light sources. Other implementations may include, for example, additional light pairs and additional circuitry to control the light sources independently, for example using multiplexors or LED matrix driver circuits.

The following is example pseudo-cod for, for example, the microcontroller.

[PSEUDOCODE START]
Count down by illuminating LED pairs 5, 4, 3, 2, 1 for one second each
   For each illumination delay [4000, 2000, 1500, 1000, 750, 500, 250] microseconds:
      Flash an LED pair 3 times to indicate the illumination delay index Repeat for 2× the frame rate:
      LED index i=1
      While i<number of LEDs:
         Illuminate LED pair i only
         Wait for the illumination delay
         Increment the index i by 1
         Wait for 1/(frame rate*frame rate)
Wait for three seconds before repeating cycle
[PSEUDOCODE END]

Figure 6:
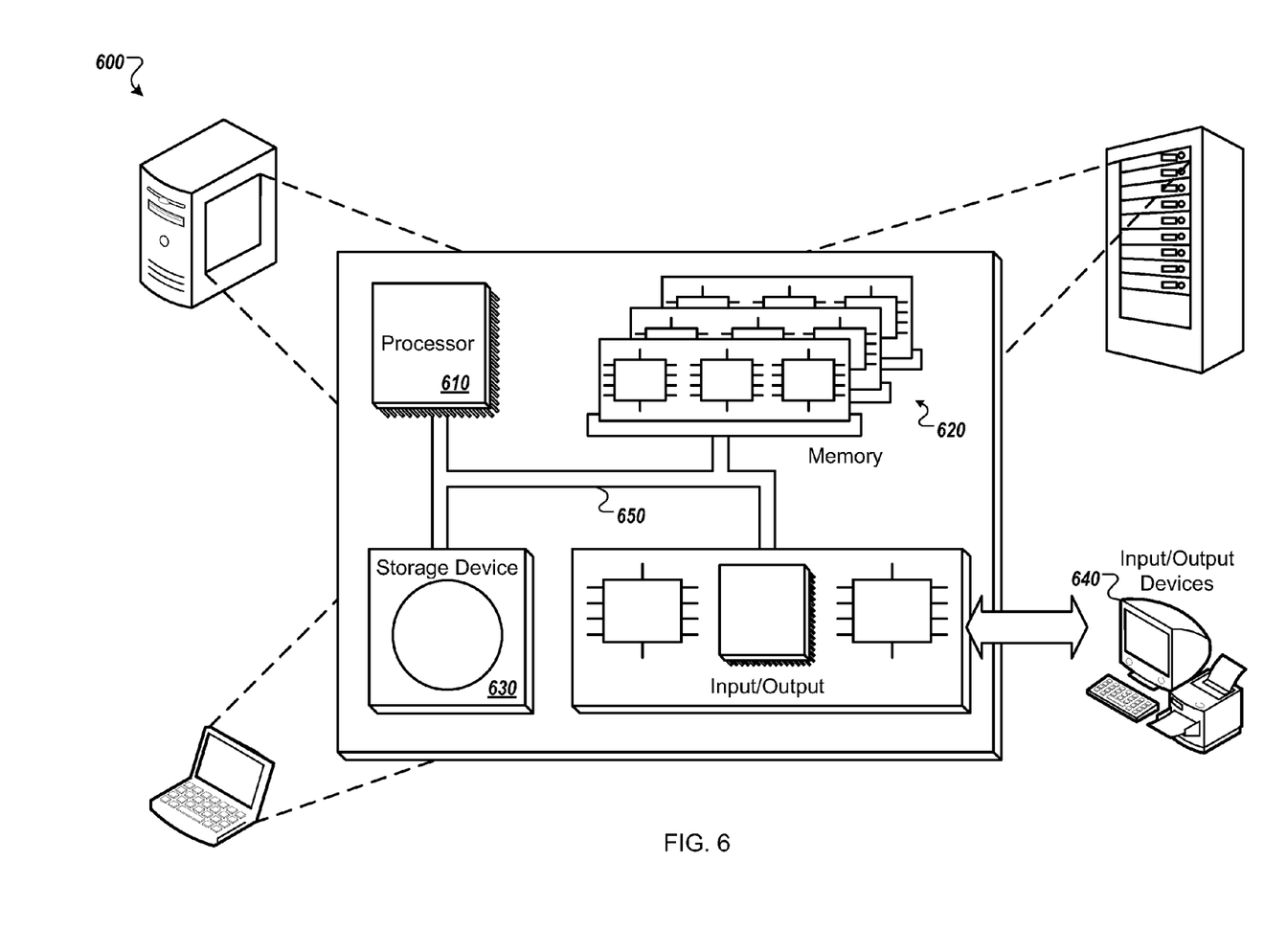
FIG. 6 is a block diagram of a computing system that can be used in connection with computer-implemented methods described in this document.

FIG. 6 is a schematic diagram that shows an example of a computing system 600. The computing system 600 can be used for some or all of the operations described previously, according to some implementations. The computing system 600 includes a processor 610, a memory 620, a storage device 630, and an input/output device 640. Each of the processor 610, the memory 620, the storage device 630, and the input/output device 640 are interconnected using a system bus 650. The processor 610 is capable of processing instructions for execution within the computing system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the computing system 600. In some implementations, the memory 620 is a computer-readable medium. In some implementations, the memory 620 is a volatile memory unit. In some implementations, the memory 620 is a non-volatile memory unit.

The storage device 630 is capable of providing mass storage for the computing system 600. In some implementations, the storage device 630 is a computer-readable medium. In various different implementations, the storage device 630 may be a floppy disk device, a hard disk device, an optical disk device, or a tape device.

The input/output device 640 provides input/output operations for the computing system 600. In some implementations, the input/output device 640 includes a keyboard and/or pointing device. In some implementations, the input/output device 640 includes a display unit for displaying graphical user interfaces.

Some features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM (erasable programmable read-only memory), EEPROM (electrically erasable programmable read-only memory), and flash memory devices; magnetic disks such as internal hard disks and removable disks; magneto-optical disks; and CD-ROM (compact disc read-only memory) and DVD-ROM (digital versatile disc read-only memory) disks. The processor and the memory can be supplemented by, or incorporated in, ASICs (application-specific integrated circuits).

To provide for interaction with a user, some features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

Some features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN (local area network), a WAN (wide area network), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. An apparatus for determining a rolling shutter timing of a camera, the apparatus comprising:
   a housing;
   a plurality of vertically aligned pairs of light sources attached to the housing, each pair of light sources comprising a first light source and a second light source;
   a control module configured to sequentially illuminate the vertically aligned pairs of light sources such that when an individual pair of light sources is illuminated the first and second light sources of the pair are illuminated simultaneously and a delay between illuminating each successive pair of light sources is sufficiently short to create an image having a rolling shutter artifact when captured by a camera having a rolling shutter delay.

2. The apparatus of claim 1, wherein each pair of light sources includes an upper light source and a lower light source, and wherein the upper light sources are horizontally aligned and the lower light sources are horizontally aligned below the corresponding upper light sources.

3. The apparatus of claim 1, further comprising a computing system configured to determine the duration of the rolling shutter delay based on an image of the device captured by the camera.

4. The apparatus for determining a rolling shutter timing of a camera according to claim 1 wherein the plurality of vertically aligned pairs of light sources comprises first and second parallel rows of light sources where for each pair of light sources in the plurality of vertically aligned pairs of light sources the first light source is arranged in the first row and the second light source is arranged in the second row.

5. The apparatus for determining a rolling shutter timing of a camera according to claim 4 wherein the plurality of vertically aligned pairs of light sources comprise sequentially arranged first through $n^{th}$ pairs of vertically aligned pairs of light sources and the control module is configured to illuminate the sequentially arranged vertically aligned pairs of light sources by, for each of the first through $n^{th}$ pairs of vertically aligned pairs of light sources and starting with the first pair, repeating an illumination sequence of:
   illuminating a particular vertically aligned pair of light sources and delaying an illumination delay time before illuminating a next vertically aligned pair of light sources adjacent to the particular vertically aligned pair of light sources.

6. The apparatus for determining a rolling shutter timing of a camera according to claim 5 wherein the control module is further configured to: after the $n^{th}$ pair of vertically aligned pairs of light sources is illuminated in the illumination sequence, delay a cycle time that is greater than the illumination delay time; and after the cycle time, turn off all the light sources in the plurality of vertically aligned light sources and repeat the illumination sequence starting with illuminating the first vertically aligned pair of light sources for the illumination time.

7. The apparatus for determining a rolling shutter timing of a camera according to claim 6 wherein the control module is configured to accept user input to set the illumination delay time and the cycle time.

8. A system comprising a plurality of vertically aligned pairs of light sources and a control module, wherein the control module is configured to sequentially illuminate vertically aligned pairs of light sources by applying an illumination cycle comprising:
   alternately, (i) illuminating a pair of vertically aligned pairs of light sources and (ii) delaying by an illumination delay; and
   turning off all light sources after all light sources have been illuminated; and
   wherein the output illumination can be captured by a camera having a rolling shutter delay to create an image having a rolling shutter artifact.

9. The system of claim 8, wherein to turn off all light sources, the control module is further configured to delay for a cycle delay.

10. The system of claim 9, wherein the camera has an exposure time; and
   the illumination delay is the exposure time divided by the number of vertically aligned pairs of light sources.

11. The system of claim 10, wherein the cycle delay is less than the illumination delay.

12. The system of claim 9, wherein the system further comprises an input module for receiving the illumination delay and the cycle delay.

13. A method comprising:
   receiving an image, captured by a camera with a rolling shutter delay, of a device configured to sequentially illuminate vertically aligned pairs of light sources by alternately i) illuminating a pair of vertically aligned pairs of light sources and ii) delaying for an illumination delay; and
   determining, with a processor, the duration of the rolling shutter delay by:
      determining the portion of the image between upper light sources in each pair and the lower light sources in each pair;
      determining the differences in a count of upper light sources in each pair that appear to be lit and a count of lower light sources in each pair that appear to be lit in the image;
      determining an inner-row delay by multiplying the difference by the illumination delay; and
      determining the duration by adjusting the inner-row delay for the entire image; and
   outputting, with the processor, the duration of the rolling shutter delay.

14. The method of claim 13, wherein each pair of light sources includes an upper light source and a lower light source, and wherein the upper light sources are horizontally aligned and the lower light sources are horizontally aligned below the corresponding upper light sources.

15. The method of claim 13 further comprising:
   receiving, by a computing system, a video, captured by the camera, of the device, the video containing the image; and finding, by a computing system, the image in the video by receiving an indication that a count of upper light sources in each pair that appear to be lit is different than a count of lower light sources in each pair that appear to be lit in the image.

16. The method of claim 15 wherein the image was captured when the illumination of the device and the video recording of the camera were in phase.

17. A method for determining a rolling shutter timing of a camera with a device comprising a plurality of vertically aligned pairs of lights sources, each pair of light sources comprising a first light source and a second light source, the method comprising:
sequentially illuminating the plurality of vertically aligned pairs of light sources such that when an individual of light sources is illuminated the first and second light sources of the pair are illuminated simultaneously and a delay between illuminating each successive pair of light sources is sufficiently short to create an image having a rolling shutter artifact; and
capturing the image with a camera having a rolling shutter artifact.

18. The method of claim 17, wherein each pair of light sources includes an upper light source and a lower light source, and wherein the upper light sources are horizontally aligned and the lower light sources are horizontally aligned below the corresponding upper light sources.

19. The method for determining a rolling shutter timing of a camera according to claim 17 further comprising, after capturing the image, analyzing the image with a processor to calculate the rolling shutter delay of the camera.

20. The method for determining a rolling shutter timing of a camera according to claim 19 wherein the processor determines a difference in a number of first light sources and second light sources illuminated in the image when calculating the rolling shutter delay of the camera.

21. A method comprising:
sequentially illuminating, by a device comprising a plurality of vertically aligned pairs of light sources, the vertically aligned pairs of light sources by cycling between:
alternately i) illuminating a pair of vertically aligned pairs of light sources and ii) delaying for an illumination delay; and
turning off all light sources after all light sources have been illuminated; and
wherein the output illumination can be captured by a camera having a rolling shutter delay to create an image having a rolling shutter artifact.

22. The method of claim 21, wherein turning off all light sources comprises delaying for a cycle delay.

23. The method of claim 22, wherein the camera has an exposure time; and
the illumination delay is the exposure time divided by the number of vertically aligned pairs of light sources.

24. The method of claim 12, wherein the cycle delay is less than the illumination delay.

25. The method of claim 22 further comprising receiving, through an input module, the illumination delay and the cycle delay.

* * * * *

UNITED STATES PATENT AND TRADEMARK OFFICE
CERTIFICATE OF CORRECTION

| | | |
|---|---|---|
| PATENT NO. | : 9,077,961 B1 | |
| APPLICATION NO. | : 13/830460 | |
| DATED | : July 7, 2015 | |
| INVENTOR(S) | : Jeffrey Saltzman | |

It is certified that error appears in the above-identified patent and that said Letters Patent is hereby corrected as shown below:

In the Claims

In Claim 24, column 12, lines 25, please delete the words "Claim 12" and insert the words --Claim 23-- so that the line reads:

The method of claim 23, wherein the cycle delay is less

Signed and Sealed this
Twenty-fourth Day of November, 2015

Michelle K. Lee
*Director of the United States Patent and Trademark Office*